US011263912B2

(12) United States Patent
Davis et al.

(10) Patent No.: US 11,263,912 B2
(45) Date of Patent: Mar. 1, 2022

(54) AIRCRAFT TAXI ASSISTANCE AVIONICS

(71) Applicant: Gulfstream Aerospace Corporation, Savannah, GA (US)

(72) Inventors: Bethany Davis, Savannah, GA (US); Michael Knight, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 278 days.

(21) Appl. No.: 16/542,122

(22) Filed: Aug. 15, 2019

(65) Prior Publication Data

US 2021/0049919 A1 Feb. 18, 2021

(51) Int. Cl.
| | |
|---|---|
| *G08G 5/06* | (2006.01) |
| *G08G 5/02* | (2006.01) |
| *B64F 5/40* | (2017.01) |
| *B64F 5/60* | (2017.01) |
| *B64D 43/02* | (2006.01) |

(52) U.S. Cl.
CPC ............. *G08G 5/065* (2013.01); *B64D 43/02* (2013.01); *B64F 5/40* (2017.01); *B64F 5/60* (2017.01); *G08G 5/025* (2013.01)

(58) Field of Classification Search
None
See application file for complete search history.

(56) References Cited

U.S. PATENT DOCUMENTS

| | | | | |
|---|---|---|---|---|
| 4,541,237 A | * | 9/1985 | Dickey | ...................... F02C 9/28 60/39.281 |
| 7,113,202 B2 | * | 9/2006 | Konya | ...................... B64C 25/50 348/117 |
| 8,620,493 B2 | * | 12/2013 | Hughes | ................ G05D 1/0083 701/3 |
| 9,033,273 B2 | * | 5/2015 | Edelson | ................ B64C 25/405 244/50 |
| 9,293,055 B2 | * | 3/2016 | Nutaro | .................... G08G 5/065 |
| 9,472,107 B2 | * | 10/2016 | Lissajoux | ............ G08G 5/0021 |
| 9,688,392 B2 | * | 6/2017 | Kawalkar | .............. B64D 31/06 |
| 9,802,696 B2 | * | 10/2017 | Garaygay | ............... B64C 25/50 |

(Continued)

OTHER PUBLICATIONS

Jaroslav Burki, et al, Automation of Taxiing, Czech Technical University in Prague, Faculty of Transportation Sciences Department of Air Transport, Magazine of Aviation Development, 5(1): 6-11, 2017, ISSN: 1805-7578.

*Primary Examiner* — James J Lee
*Assistant Examiner* — Sophia Antonia Skipper
(74) *Attorney, Agent, or Firm* — LKGlobal | Lorenz & Kopf, LLP (57) ABSTRACT

An aircraft includes an engine, a thrust reverser, landing gear, a brake system, a pilot input device, and a control system. The engine is configured to generate thrust directed to move the aircraft in a forward direction. The landing gear includes wheels. The brake system is configured to generate a braking force on the wheels. The pilot input device is positioned for use by a pilot of the aircraft. The control system is programmed to: determine whether the taxi operations are allowed; receive a request to achieve and hold a taxi speed at a desired taxi speed from the pilot input device; and command the engine, the thrust reverser, and the brake system to achieve and maintain the desired taxi speed in response to receiving the request to hold taxi speed only when the taxi operations are allowed.

17 Claims, 5 Drawing Sheets

(56) References Cited

U.S. PATENT DOCUMENTS

| | | | |
|---|---|---|---|
| 10,209,710 B2* | 2/2019 | Lepage | B64D 31/06 |
| 10,343,786 B2* | 7/2019 | Nestico | F02K 3/06 |
| 10,417,919 B1* | 9/2019 | Jayathirtha | B64C 25/426 |
| 10,543,909 B2* | 1/2020 | Kipp | B64C 25/426 |
| 2009/0150011 A1* | 6/2009 | Villaume | G01C 23/00 |
| | | | 701/3 |
| 2015/0225075 A1* | 8/2015 | Renier | B64C 25/405 |
| | | | 244/50 |
| 2016/0200428 A1* | 7/2016 | Morris | B64C 25/34 |
| | | | 244/50 |
| 2020/0377090 A1* | 12/2020 | Seccamonte | B60W 60/0011 |
| 2021/0043097 A1* | 2/2021 | Gaertner | G08G 5/025 |
| 2021/0139156 A1* | 5/2021 | Hamel | F02C 9/44 |

* cited by examiner

AIRCRAFT TAXI ASSISTANCE AVIONICS

TECHNICAL FIELD

The present disclosure generally relates to aircraft avionics with taxi assistance for pilots, and more particularly relates to systems and methods for using thrust, brakes, and thrust reversers in concert in response to a pilot input during taxi operations.

BACKGROUND

Starting, stopping, turning, and taxiing an airplane smoothly in a manner comfortable to the passengers requires pilot finesse only learned by the pilot gaining experience with the airplane. Even an experienced pilot operating an unfamiliar aircraft may cause passengers to endure jerky and uncomfortable taxi operations before and after a smooth flight. For example, the sensitivity of the brakes, the sensitivity of the tiller, the power of the engines, the weight of the aircraft, and other factors may combine to give even an experienced pilot difficulty providing smooth taxi operations. Many pilots start taxiing by moving thrust levers either full forward or very far forward for a few seconds, allowing thrust to build enough to overcome the resting inertia of the aircraft. Then, when the jet starts rolling, the pilot must quickly reduce thrust and/or apply aircraft wheel brakes to avoid excessive acceleration. This causes passengers to hear a large increase followed by a sudden decrease in jet engine noise. The noise changes are not typically pleasant for the passengers. Passengers can feel a slow acceleration followed by a rapid, jerky deceleration. Such deceleration may cause passengers and flight attendants to stumble, fall, or spill drinks. Additionally, the large changes in thrust may cause jet blast damage to objects (e.g., aircraft, ground crew) located behind the airplane. To stop taxiing, pilots often rapidly reduce thrust and apply brakes which behave in a non-linear fashion, causing passengers to hear a sudden decrease in jet engine noise and feel a rapid, jerky deceleration.

During the taxi phase, pilots often keep thrust levers at idle and prefer to use the brakes or thrust reversers as little as possible in order to provide a smooth taxi. However, the idle thrust of the engines can still cause the jet to accelerate too quickly because the engine idle thrust is typically great enough to reach high taxi speeds. To slow the aircraft, the pilot deploys the thrust reversers and/or presses the brakes. When the jet slows down, the pilot stows the reversers and ceases pressing the brakes. The pilot then repeats the process to manage the aircraft taxi speed for the duration of the taxi phase. As a result, passengers can be exposed to a slow and/or a rapid, jerky deceleration which may cause discomfort. Deploying the thrust reversers during the taxi phase may result in engine exhaust gases which can enter the air conditioning intake and cause the cabin to smell of exhaust fumes or fuel vapor. Aircraft wheel brakes are typically designed to decelerate the aircraft during landing, and are greatly oversized for taxi operations, making smooth braking during taxi operations difficult for the pilot. If pilots ride the brakes during taxi to manage taxi speeds, the brakes wear rapidly and are expensive to replace.

Turning the aircraft while the aircraft is on the ground is typically accomplished using a combination of differential braking of the main wheels and using a tiller coupled with a nose wheel of the aircraft. Both the brakes and the tiller can be extremely sensitive and responds to the slightest change in input. The entry and exit of the turn therefore often expose passengers to jerky lateral movements which can cause discomfort.

Accordingly, it is desirable to provide methods, systems, and aircraft that provide aircraft taxi assistance for pilots to facilitate a smooth taxi. Furthermore, other desirable features and characteristics of the present disclosure will become apparent from the subsequent detailed description and the appended claims, taken in conjunction with the accompanying drawings and the foregoing technical field and background.

SUMMARY

In a first non-limiting example, an aircraft includes an engine, a thrust reverser, landing gear, a brake system, a pilot input device, and a control system. The engine is configured to generate thrust directed to move the aircraft in a forward direction. The thrust reverser is operatively coupled with the engine to generate thrust opposing movement of the aircraft in the forward direction. The landing gear includes wheels. The brake system is configured to generate a braking force on the wheels. The pilot input device is positioned for use by a pilot of the aircraft. The control system is programmed to: determine whether the taxi operations are allowed; receive a request to hold taxi speed at a desired taxi speed from the pilot input device; and command the engine, the thrust reverser, and the brake system to smoothly achieve and maintain the desired taxi speed in response to receiving the request to hold taxi speed only when the taxi operations are allowed.

In a second non-limiting example, an aircraft includes an engine, a thrust reverser, landing gear, a brake system, a pilot input device, and a control system. The engine is configured to generate thrust directed to move the aircraft in a forward direction. The thrust reverser is operatively coupled with the engine to generate thrust opposing movement of the aircraft in the forward direction. The landing gear includes wheels. The brake system is configured to generate a braking force on the wheels. The pilot input device is positioned for use by a pilot of the aircraft. The control system is programmed to: determine whether the taxi operations are allowed; receive a request to hold taxi speed at a desired taxi speed from the pilot input device; and command the engine, the thrust reverser, and the brake system to achieve and maintain the desired taxi speed in response to receiving the request to hold taxi speed only when the taxi operations are allowed and based on a predetermined maximum acceleration and a predetermined maximum jerk to maintain passenger comfort.

BRIEF DESCRIPTION OF THE DRAWINGS

Advantages of the present disclosure will be readily appreciated, as the same becomes better understood by reference to the following detailed description when considered in connection with the accompanying drawings wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Various embodiments disclosed herein describe systems and methods for assisting pilots with taxi operations in airplanes. For example, the systems and methods may assist with taxi speed holding, smooth starting and stopping of the airplane during taxi operations, smooth turn onsets during taxi operations, and airplane self-taxi guidance.

In some embodiments, a pilot of the airplane initiates an airplane taxi start from a stop (i.e., speed of zero, no landing gear wheel rotation) by providing an input to a control such as a button and/or knob in a flight deck. The airplane then determines it is on the ground and is on a ramp/taxiway by using navigation sensors, inertial sensors, weight on wheel sensors, and similar systems. If the airplane is on the ground the system may increase engine thrust to an optimal taxi engine pressure ratio (EPR) for smooth acceleration based on a current aircraft weight. The airplane then decreases engine thrust to an optimal taxi EPR for a constant taxi speed during straight ahead operations and may modulate the EPR based on tiller steering inputs to reduce the taxi speed for a turn of the aircraft.

In some embodiments, the pilot initiates a stop of the airplane by providing an input to a control such as a button and/or knob the in the flight deck. The airplane then determines it is on the ground as discussed above and decreases the EPR to a predetermined minimum taxi value. An auto brake system of the airplane applies brakes to stop the airplane from a taxi within a predetermined stopping distance or using a predetermined deceleration schedule for a smooth stop.

In some embodiments, the system computes and displays where the aircraft will actually come to rest on a moving map or other navigation display when the pilots use the control to command the aircraft to perform a smooth stop. For example, the system may show a symbol or other notation on the same display continuously which would depict where the aircraft would be expected to come to rest if the crew were to command a stop. Accordingly, a pilot may simply push the button to command the aircraft to perform a smooth stop when the symbol reaches the feature or location on the navigation display where the pilot would like the aircraft to stop.

In some embodiments, a flight controls system of the aircraft deploys and stows spoilers, speedbrakes, or other flight control surfaces and a thrust reverser system deploys and stows to assist to assist in maintaining a comfortable taxi speed. In some embodiments, the thrust reversers are utilized in response to determining that the airplane is on a taxiway and are not utilized when the airplane is on a ramp.

In some embodiments, aircraft cameras, communication, and navigation sensors drive inputs to the autobrake system and a nose wheel steering system for guiding the airplane along a centerline of the taxiway. For example, on a taxiway with a centerline present, the pilot may monitor the aircraft self-guidance without taking action as the aircraft is guided along the centerline. On a ramp without a centerline, the pilot may initiate a turn with an input on a button and/or knob in the flight deck to smoothly turn the airplane during taxi operations.

In some embodiments, the system highlights on a navigation display the feature that the system thinks it is following. For example, overlay breadcrumbs, lines, or other symbols may be displayed to indicate the centerline that the system is detecting and following. Accordingly, the crew may monitor the system and confirm that the system is not following pavement seams, skid marks, or other random features on the taxiway Referring now to FIG. 1, an example of an aircraft 100 is illustrated in accordance with some embodiments. Aircraft 100 includes a surveillance sensor system 101, a nose wheel steering system 102, navigation system 103, a communication system or datalink 104, a Global Navigation Satellite System (GNSS) 105 (e.g., a Global Positioning System), a flight controls system 106, a braking system 107, a thrust reverser 108, an engine thrust system 109, and inertial sensors 110.

Figure 1:
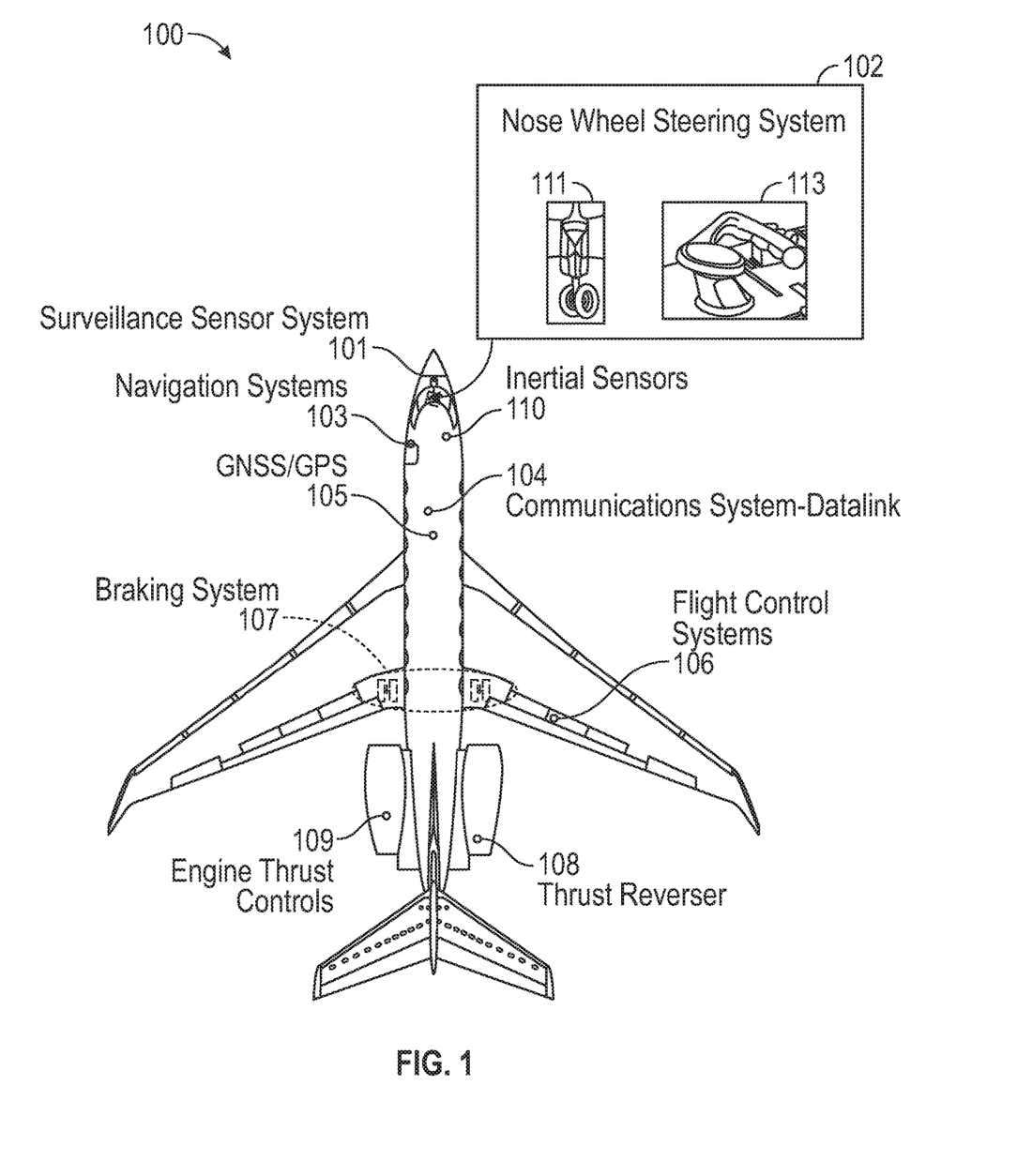
FIG. 1 is a schematic diagram illustrating an aircraft, in accordance with various embodiments.

Nose wheel steering system 102 includes a nose wheel of landing gear 111 and includes a tiller 113. The nose wheel of landing gear 111 is disposed at a bottom front portion of aircraft 100, as will be appreciated by those with ordinary skill in the art. Tiller 113 is operatively coupled with landing gear 111 for steering the aircraft by rotating the nose wheel.

Figure 2:
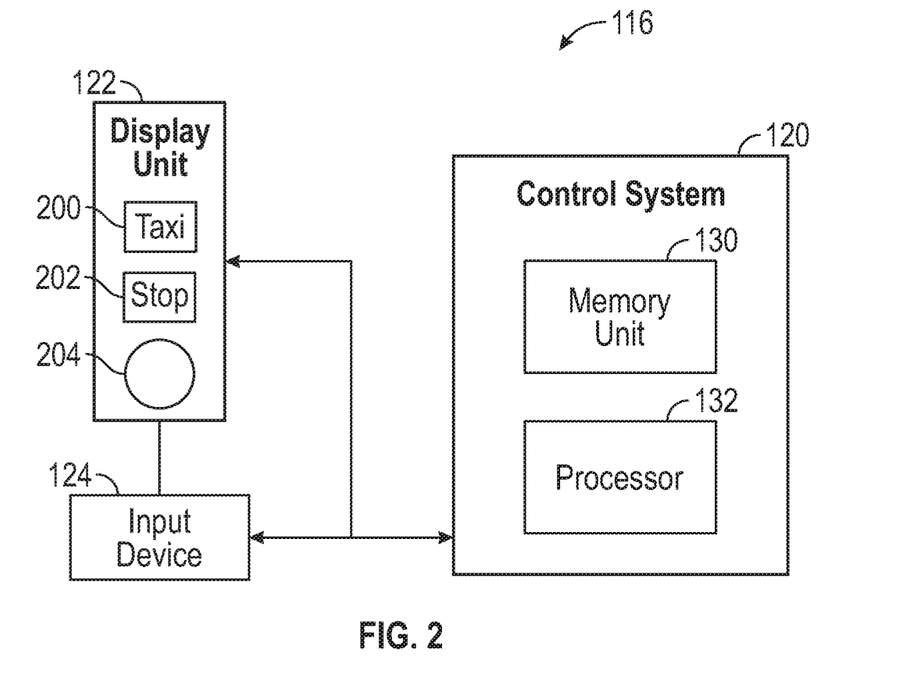
FIG. 2 is a simplified block diagram of an avionics system of the aircraft of FIG. 1, in accordance with various embodiments.

Referring now to FIG. 2, and with continued reference to FIG. 1, an avionics system 116 of aircraft 100 is illustrated in accordance with some embodiments. Avionics system 116 includes a control system 120, a display 122, and a pilot input device 124. Display 122 is a screen or other visual user interface. Pilot input device 124 may be a touch sensor, a joystick/mouse or other curser control device, or other device that receives user input. In the example provided, display 122 and pilot input device 124 are integrated into a touchscreen display located in front of a pilot in a flight deck of aircraft 100.

Control system 120 is a computer or group of computers collectively programmed to perform the algorithms described below. For example, computers of different systems 101-109 may form part of control system 120 when various functions are programmed into the different systems 101-109 to cooperatively perform the algorithms described below. Control system 120 includes at least one processor 132 and a non-transitory computer readable storage device or medium 130. Non-transitory computer readable storage device or medium 130 is a storage device for storing instructions for performing the method described below. At least one processor 132 includes a plurality of compute units for executing the instructions to perform the method described below. The processor may be any custom made or commercially available processor, a central processing unit (CPU), a graphics processing unit (GPU), an auxiliary processor among several processors associated with control system 120, a semiconductor based microprocessor (in the form of a microchip or chip set), a macroprocessor, any combination thereof, or generally any device for executing instructions. The computer readable storage device or medium 130 may include volatile and nonvolatile storage in read-only memory (ROM), random-access memory (RAM), and keep-alive memory (KAM), for example. The computer-readable storage device or medium 130 may be implemented using any of a number of known memory devices such as PROMs (programmable read-only memory), EPROMs (Erasable PROM), EEPROMs (electrically erasable PROM), flash memory, or any other electric, magnetic, optical, or combination memory devices capable of storing data, some of which represent executable instructions, used by control system 120 in controlling aircraft 100.

The instructions may include one or more separate programs, each of which comprises an ordered listing of executable instructions for implementing logical functions. The instructions, when executed by the processor, receive and process signals from the sensor system, perform logic, calculations, methods and/or algorithms for automatically controlling the components of aircraft 100, and generate control signals to automatically control the components of aircraft 100 based on the logic, calculations, methods, and/or algorithms. Although only one control system 120 is shown in FIG. 1, embodiments of aircraft 100 may include any number of control systems 120 that communicate over any suitable communication medium or a combination of communication media and that cooperate to process the sensor signals, perform logic, calculations, methods, and/or algorithms, and generate control signals to automatically control features of aircraft 100. As used herein, the term "programmed to" means that the instructions for performing an algorithm are stored in a non-transitory medium (e.g., memory unit 130) of control system 120.

In the example provided, control system 120 commands display 122 to generate a taxi hold selector 200, a stop selector 202, and a graphical dial 204 on the touchscreen display. Taxi hold selector 200 may be used, for example, to receive a pilot input instructing control system 120 to start and maintain a constant speed aircraft taxi. Stop selector 202 may be used, for example, to receive a pilot input instructing control system 120 to bring aircraft 100 to a stop within a predetermined distance during taxi operations. Graphical dial 204 may be used, for example, to receive a pilot input instructing control system 120 to initiate and complete a turn of aircraft 100 during taxi operations. Graphical dial 204 may indicate a turning rate, a turning radius, an angle to turn to, or any other value that may be used to define the turn. In some embodiments, taxi hold selector 200, stop selector 202, and graphical dial 204 are physical buttons and a knob for inputting the pilot instructions.

Figure 3:
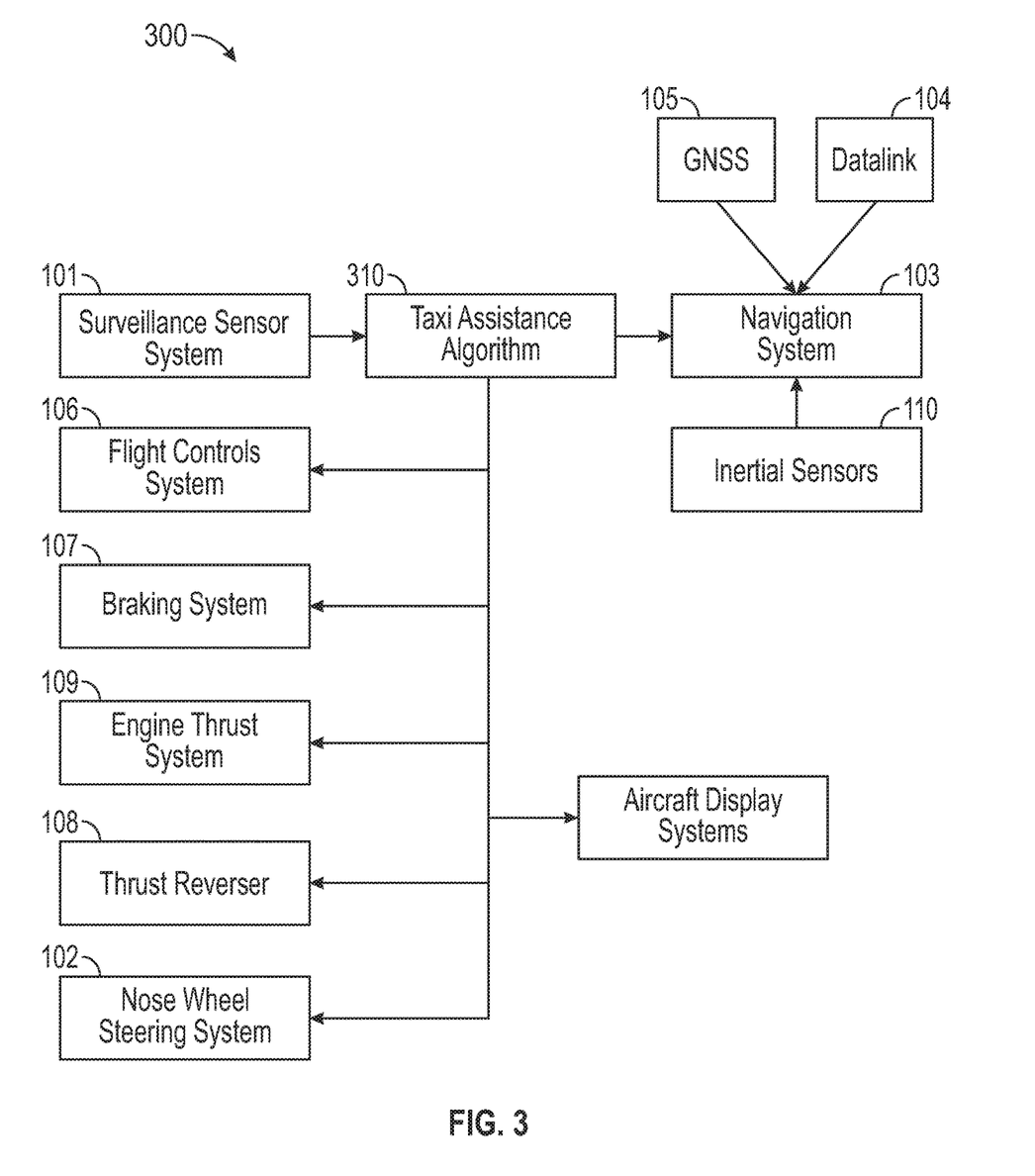
FIG. 3 is a simplified block diagram of data flows through systems of the aircraft of FIG. 1.

Referring now to FIG. 3, and with continued reference to FIGS. 1-2, a system interaction diagram 300 is illustrated in accordance with some embodiments. System interaction diagram 300 illustrates the data inputs to and outputs from a taxi assistance algorithm 310. Taxi assistance algorithm is stored as a non-transitory computer program product that includes instructions to perform the methods described below. Taxi assistance algorithm receives routing instructions, calculates instructions for aircraft 100, and follows an approved route at desired speeds without exceeding an acceleration threshold predetermined for passenger comfort.

Surveillance sensor system 101 and inertial sensors 110 includes one or more sensing devices that sense observable conditions of the exterior environment, the interior environment of aircraft 100, or operational conditions and status of aircraft 100. Surveillance sensor system 101 scans the environment to verify a position, detect potential obstacles, and monitor the route along which taxi assistance algorithm 310 is guiding aircraft 100. Inertial sensors 110 report accelerations during taxi and display 122 presents information about the taxi assistance and the route for crew monitoring and final approval. Inertial sensors 110 may include accelerometers and gyroscopes while surveillance sensor system 101 may include RADARs, LIDARs, optical cameras, thermal cameras, ultrasonic sensors, and/or other sensors.

Nose wheel steering system 102 is configured to steer the aircraft during taxi operations. For example, nose wheel steering system 102 may steer the aircraft by rotating the nose wheel of landing gear (not numbered) to a steering angle that will achieve a desired turn of aircraft 100 according to turning instructions entered by the pilot or to follow a defined and approved route calculated by taxi assistance algorithm 310.

Navigation system 103 provides an airport database and taxiway/runway information. For example, navigation system 103 may store maps and other information indicating where taxi assistance algorithm 310 may guide aircraft 100. Datalink 104 communicates with Air Traffic Control to receive approved taxi clearances and communicates the taxi clearances to taxi assistance algorithm 310.

GNSS 105 determines a position of aircraft 100 and flight controls system 106 deploys and stows spoilers and other flight control surfaces to assist in control of taxi speed and stopping.

Braking system 107 assists in control of taxi speed and stopping as required. For example, brake system 107 is configured to generate a braking force on wheel of landing gear 111 to slow aircraft 100.

Engine thrust system 109 applies and reduces thrust as required to reach the target taxi speed. For example, engine thrust system 109 may apply thrust by commanding a jet engine (not numbered) of aircraft 100 to move aircraft 100 in a forward direction when thrust reverser 108 is stowed. Taxi assistance algorithm 310 actuates thrust reverser 108 doors as necessary to assist with control of taxi speed. Thrust reverser 108 is operatively coupled with the engine to generate thrust opposing movement of the aircraft in the forward direction.

Flight controls system 106 includes one or more actuator devices that control one or more flight control surfaces on aircraft 100. For example, flight controls system 106 may include actuators that manipulate or move an elevator, a stabilizer, a flap, a spoiler, or any other primary or secondary flight control in aircraft 100.

Figure 4:
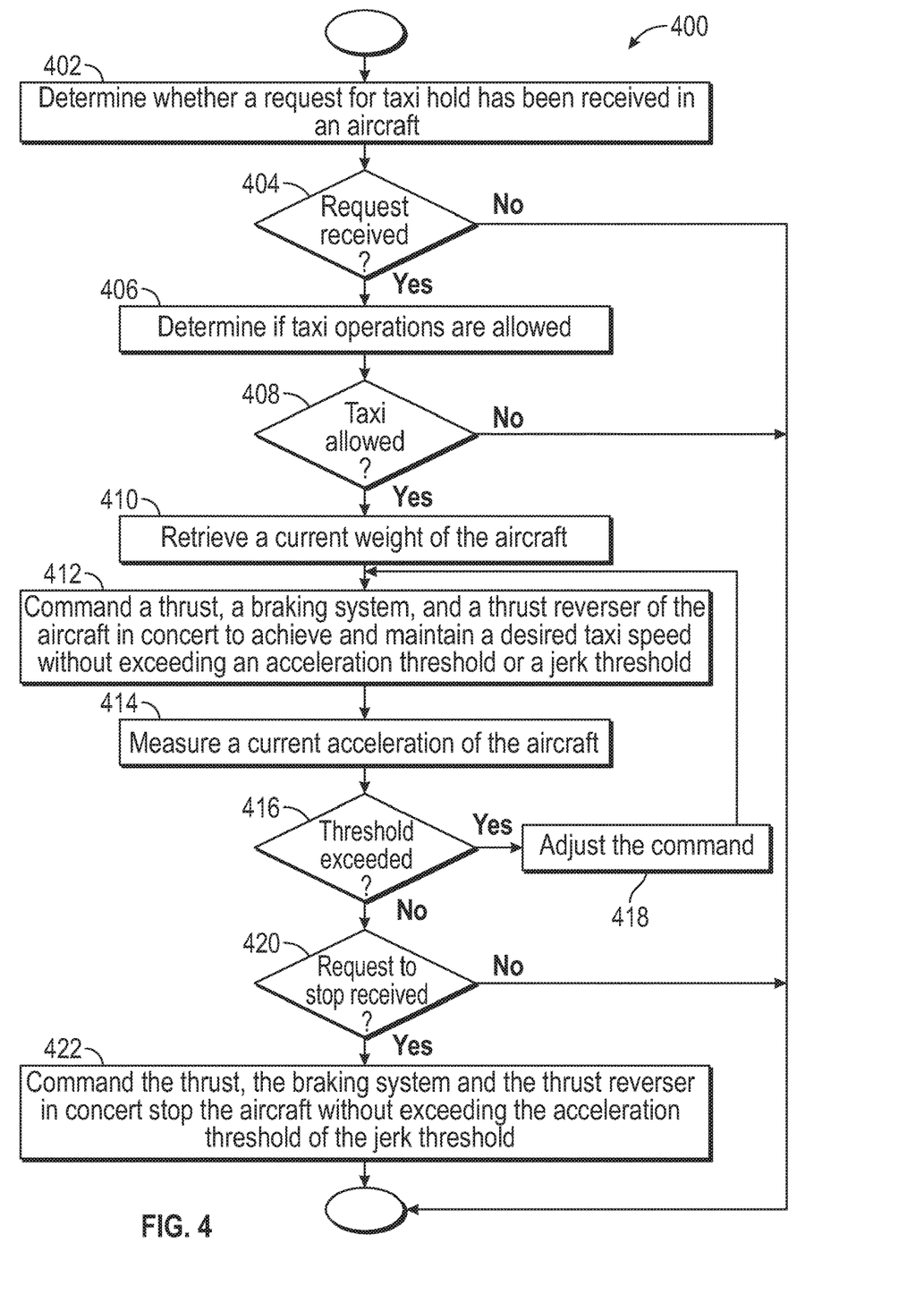
FIGS. 4 and 5 are a flow charts illustrating methods for controlling an aircraft during taxi operations, in accordance with various embodiments.

Referring now to FIG. 4, and with continued reference to FIGS. 1-3, a method 400 for controlling an aircraft during taxi operations is illustrated in flow diagram form. In the example provided, control system 120 performs the tasks of method 400. For example, control system 120 may store instructions on storage device 130 for processor 132 to execute to perform the tasks of method 400.

Task 402 determines whether a request for taxi hold has been received in an aircraft. For example, task 402 may determine that a request to hold taxi speed at a desired taxi speed has been received in response to an input at pilot input device 124. In the example provided, control system 120 determines that the request to hold taxi speed has been received in response to selection of taxi hold selector 200 on the touchscreen display.

Task 404 ends method 400 if no request for taxi hold has been received. Task 404 routes method 400 to task 406 when a request for taxi hold has been received. Task 406 determines whether taxi operations are allowed. For example, taxi operations may be allowed when aircraft 100 is on the ground and is not currently taking off or landing. In some embodiments, control system 120 determines whether taxi operations are allowed based on inputs from weight on wheel sensors, inertial sensors 110, GNSS 105, surveillance sensor system 101, or other sensors within or external to aircraft 100.

Task 408 ends method 400 when taxi operations are not allowed. Task 408 routes method 400 to task 410 when taxi operations are allowed. Task 410 retrieves a current weight of the aircraft. For example, the current weight may be calculated based on manually entered fuel and loading information, may be measured by sensors, may be retrieved from a database, or may be estimated using any suitable conventional method.

Task 412 commands a thrust, a braking system, and a thrust reverser of the aircraft in concert to achieve and maintain a desired taxi speed without exceeding an acceleration threshold or a jerk threshold. For example, control system may be programmed to command the thrust at least in part by setting an Engine Pressure Ratio of the engine and to command the thrust reverser by deploying and stowing thrust reverser 108. The acceleration threshold is a predetermined maximum acceleration that maintains passenger comfort as determined by the aircraft operator, owner, manufacturer, or other relevant entity. Similarly, the jerk threshold is a predetermined maximum jerk that maintains passenger comfort as determined by the aircraft operator, owner, manufacturer, or other relevant entity. In some embodiments, control system 120 is further configured to command the engine to operate at a sub-idle engine speed that is less than an idle engine speed in response to determining that the taxi operations are allowed to maintain the desired taxi speed.

In the example provided, task 412 is based on the current weight of the aircraft. When aircraft 100 is heavy, more braking force and thrust may be applied while remaining below the acceleration and jerk thresholds. In some embodiments, task 412 is based on a cost to maintain and on a cost to replace the brake system and the thrust reverser. For example, if maintaining the thrust reversers is more expensive than is replacing the brakes for typical taxi operations for a given aircraft, then task 412 will favor the brakes over the thrust reversers when slowing aircraft 100 during task 412.

Task 414 measures a current acceleration of the aircraft. For example, inertial sensors 110 are configured to measure the current acceleration of the aircraft. Task 416 routes method 400 to task 418 when the current acceleration or a current jerk exceed a predetermined passenger comfort threshold. For example, control system 120 may calculate a current jerk as a time derivative of the current acceleration. Task 418 adjusts the command to reduce the acceleration and/or jerk and returns to task 412.

Task 420 ends method 400 if a stop request has not been received and routes method 400 to task 422 when the stop request is received. For example, control system 120 may determine that a stop aircraft request has been received in response to selection of stop selector 202 of the touchscreen combination of display 122 and pilot input device 124.

Task 422 commands the thrust, the braking system, and the thrust reverser in concert to stop the aircraft without exceeding the acceleration threshold or the jerk threshold. In some embodiments, control system 120 is further configured to command the flight control surfaces to slow aircraft 100 and assist with maintaining the desired taxi speed.

Figure 5:
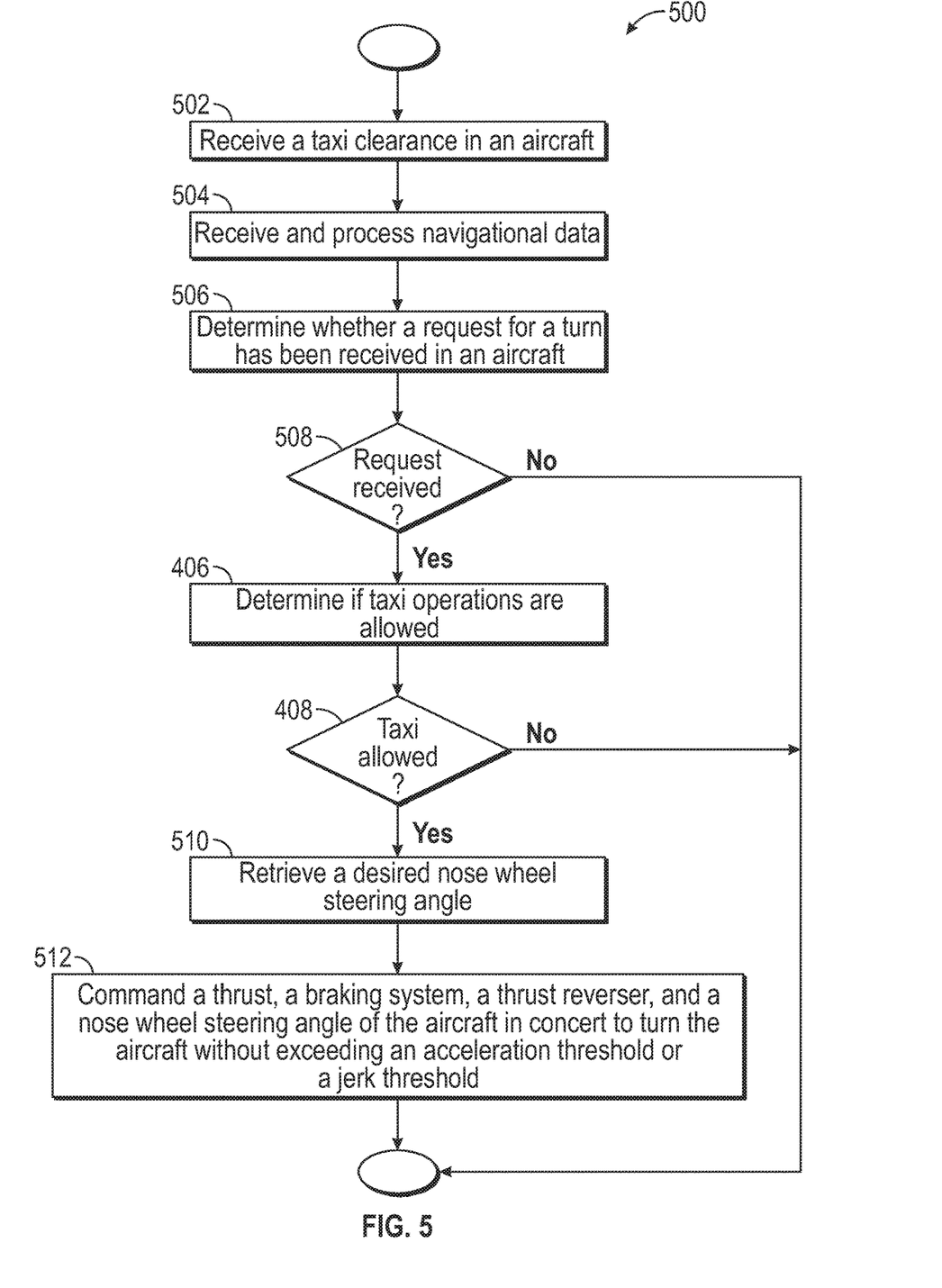

Referring now to FIG. 5, and with continued reference to FIGS. 1-4, a method 500 for controlling an aircraft during taxi operations is illustrated in flow diagram form. Some tasks of method 500 are similar to tasks of method 400, where like numbers refer to like tasks. In the example provided, control system 120 performs the tasks of method 500. For example, control system 120 may store instructions on storage device 130 for processor 132 to execute to perform the tasks of method 500. In the example provided, control system 120 may perform the tasks of method 500 concurrently with the tasks of method 400.

Task 502 receives a taxi clearance in an aircraft. For example, control system 120 may receive a taxi clearance from Air Traffic Control over datalink 104. Task 504 receives and processes navigational data.

Task 506 determines whether a request for a turn has been received in the aircraft. In the example provided, the request for a turn is received when a pilot interacts with graphical dial 204. In some embodiments, the request for a turn is received based on a comparison of the taxi clearance and a current position of aircraft 100. Task 508 ends method 500 when the request for a turn has not been received.

Task 508 routes method 500 to task 406 when the request for a turn has been received. Task 510 retrieves a desired nose wheel steering angle. In the example provided, the position of graphical dial 204 indicates the desired nose wheel steering angle.

Task 512 commands a thrust, a braking system, a thrust reverser, and a nose wheel steering angle of the aircraft in concert to turn the aircraft without exceeding an acceleration threshold or a jerk threshold. For example, control system 120 may modulate the desired taxi speed based on a steering angle of the nose wheel. In some embodiments, control system 120 is further configured to set a desired nose wheel angle based on maintaining a taxiway centerline indicated by the navigation sensors.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

It is further noted that the systems and methods may be implemented on various types of data processor environments (e.g., on one or more data processors) which execute instructions (e.g., software instructions) to perform operations disclosed herein. Non-limiting examples include implementation on a single general purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. For example, a computer can be programmed with instructions to perform the various steps of the flowcharts described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., memory, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

What is claimed is:

1. An aircraft, comprising:
    an engine configured to generate thrust directed to move the aircraft in a forward direction;
    a thrust reverser operatively coupled with the engine to generate thrust opposing movement of the aircraft in the forward direction;
    landing gear including wheels;
    a brake system configured to generate a braking force on the wheels;
    a pilot input device positioned for use by a pilot of the aircraft;
    a display positioned for use by the pilot, wherein the display is operatively coupled with the pilot input device to form a touchscreen display; and
    a control system programmed to:
        determine whether taxi operations are allowed;
        generate a taxi hold selector on the touchscreen display;
        receive, as a selection of the taxi hold selector on the touchscreen display, a request to hold taxi speed at a desired taxi speed from the pilot input device;
        command the engine, the thrust reverser, and the brake system to achieve and maintain the desired taxi speed in response to receiving the request to hold taxi speed only when the taxi operations are allowed;
        generate a stop selector on the touchscreen display;
        receive a stop aircraft request, as a selection of the stop selector on the touchscreen display, during the taxi operations from the pilot input device; and
        command the thrust, the brake system, and the thrust reverser to bring the aircraft to a stop at a maximum acceleration for passenger comfort in response to receiving the stop aircraft request only when the taxi operations are allowed.

2. The aircraft of claim 1, wherein the control system is programmed to achieve the desired taxi speed based on a predetermined maximum acceleration for passenger comfort.

3. The aircraft of claim 2, further comprising an inertial sensor configured to measure a current acceleration of the aircraft, wherein the control system is programmed to adjust the command of the thrust, the thrust reverser, and the brake system in response to the current acceleration exceeding the predetermined maximum acceleration.

4. The aircraft of claim 1, wherein the control system is further programmed to command the thrust reverser and the brake system based on a cost to maintain and on a cost to replace the brake system and the thrust reverser.

5. The aircraft of claim 1, wherein the control system is programmed to achieve the desired taxi speed based on a predetermined maximum jerk for passenger comfort.

6. The aircraft of claim 5, further comprising an inertial sensor configured to measure a current acceleration of the aircraft, wherein the control system is programmed to adjust the command of the thrust, the thrust reverser, and the brake system in response to a time derivative of the current acceleration exceeding the predetermined maximum jerk.

7. The aircraft of claim 5, wherein the control system is programmed to:
    retrieve a current weight of the aircraft; and
    command the thrust, the thrust reverser, and the brake system based on the current weight of the aircraft.

8. The aircraft of claim 7, wherein the control system is programmed to command the thrust at least in part by setting an Engine Pressure Ratio of the engine.

9. The aircraft of claim 1, further comprising a tiller operatively coupled with the landing gear for steering the aircraft, and wherein the control system is further programmed to modulate the desired taxi speed based on a nose wheel steering angle.

10. The aircraft of claim 1, wherein the control system is further configured to command the thrust by commanding the engine to operate at a sub-idle engine speed that is less than an idle engine speed in response to determining that the taxi operations are allowed.

11. The aircraft of claim 10, wherein the control system is further configured to set the sub-idle engine speed to maintain the desired taxi speed.

12. The aircraft of claim 1, wherein the landing gear includes a nose wheel configured to steer the aircraft during the taxi operations, and wherein the control system is further programmed to:
  receive a turn aircraft request during the taxi operations; and
  command the nose wheel to turn based on a predetermined maximum turning acceleration for passenger comfort in response to receiving the turn aircraft request only during the taxi operations.

13. The aircraft of claim 12, further comprising navigation sensors, wherein the control system is further configured to set a desired nose wheel angle based on maintaining a taxiway centerline indicated by the navigation sensors.

14. The aircraft of claim 13, further comprising a communications system configured to receive a taxi clearance from an Air Traffic Control, wherein the control system is further configured to command the nose wheel, the engine, the thrust reverser, and the brake system based on the taxi clearance.

15. The aircraft of claim 13, wherein the control system is further programmed to generate a graphical dial on the display and to set a desired nose wheel steering angle based on a pilot input corresponding to the graphical dial.

16. The aircraft of claim 1, further comprising flight control surfaces, wherein the control system is further configured to command the flight control surfaces to assist with maintaining the desired taxi speed.

17. An aircraft, comprising:
  an engine configured to generate thrust directed to move the aircraft in a forward direction;
  a thrust reverser operatively coupled with the engine to generate thrust opposing movement of the aircraft in the forward direction;
  landing gear including wheels;
  a brake system configured to generate a braking force on the wheels;
  a pilot input device positioned for use by a pilot of the aircraft;
  a display positioned for use by the pilot, wherein the display is operatively coupled with the pilot input device to form a touchscreen display; and
  a control system programmed to:
    determine whether taxi operations are allowed;
    generate a taxi hold selector on the touchscreen display;
    receive, as a selection of the taxi hold selector on the touchscreen display, a request to hold taxi speed at a desired taxi speed from the pilot input device;
    command the engine, the thrust reverser, and the brake system to achieve and maintain the desired taxi speed in response to receiving the request to hold taxi speed only when the taxi operations are allowed and based on a predetermined maximum acceleration and a predetermined maximum jerk to maintain passenger comfort;
    generate a stop selector on the touchscreen display;
    receive a stop aircraft request, as a selection of the stop selector on the touchscreen display, during the taxi operations from the pilot input device; and
    command the thrust, the brake system, and the thrust reverser to bring the aircraft to a stop at a maximum acceleration for passenger comfort in response to receiving the stop aircraft request only when the taxi operations are allowed.

\* \* \* \* \*